US010617586B2

(12) United States Patent
Katzenstein

(10) Patent No.: US 10,617,586 B2
(45) Date of Patent: Apr. 14, 2020

(54) DEVICE FOR SECURING AN ACCESSORY TO AN OPERATING TABLE

(71) Applicant: MAQUET GMBH, Rastatt (DE)

(72) Inventor: Bernhard Katzenstein, Iffezheim (DE)

(73) Assignee: MAQUET GMBH, Rastatt (DE)

( * ) Notice: Subject to any disclaimer, the term of this patent is extended or adjusted under 35 U.S.C. 154(b) by 350 days.

(21) Appl. No.: 15/605,052

(22) Filed: May 25, 2017

(65) Prior Publication Data

US 2017/0258659 A1    Sep. 14, 2017

Related U.S. Application Data

(63) Continuation-in-part of application No. PCT/EP2015/078789, filed on Dec. 7, 2015.

(30) Foreign Application Priority Data

Aug. 28, 2015    (DE) .................. 10 2015 114 402

(51) Int. Cl.
    *A61G 13/10*    (2006.01)
    *F16B 2/12*    (2006.01)
    *F16M 13/02*    (2006.01)
(52) U.S. Cl.
    CPC ............. *A61G 13/101* (2013.01); *F16B 2/12* (2013.01); *F16M 13/022* (2013.01)
(58) Field of Classification Search
    CPC ... A61G 13/101; A61B 2090/508; F16B 2/12; F16M 13/022; Y10T 279/17914
    See application file for complete search history.

(56) References Cited

U.S. PATENT DOCUMENTS

| 884,772 A * | 4/1908 | Sorenson .................. F16B 2/12 |
|  |  | 16/252 |
| 3,565,380 A * | 2/1971 | Langren ................. A47B 23/02 |
|  |  | 248/229.1 |

(Continued)

FOREIGN PATENT DOCUMENTS

| CN | 103917212 A | 7/2014 |
| CN | 104582667 A | 4/2015 |
| JP | H03-016926 U | 2/1991 |

OTHER PUBLICATIONS

International Search Report dated Aug. 29, 2016 which issued for corresponding international application PCT/EP2015/078789, 11 pages.

(Continued)

*Primary Examiner* — Robert G Santos
*Assistant Examiner* — Alexis Felix Lopez
(74) *Attorney, Agent, or Firm* — Aaron M. Miller

(57) ABSTRACT

An operating table device for securing an accessory to an operating table is disclosed. The operating table device has a first securing assembly configured to attach the operating table device to the operating table, and a second securing assembly configured to attach an elongated member of the accessory to the operating table device. The second securing assembly includes an aperture configured to receive the elongated member of the accessory. The second securing assembly includes a clamping assembly configured to clamp the elongated member of the accessory in the aperture. A cross section of the aperture has a polygonal shape, the polygonal shape being formed from at least two superimposed shapes, each of the at least two superimposed shapes having straight sides.

20 Claims, 8 Drawing Sheets

(56) References Cited

U.S. PATENT DOCUMENTS

| | | | | |
|---|---|---|---|---|
| 5,836,559 | A | * | 11/1998 | Ronci ................ A61G 13/101 |
| | | | | 248/230.3 |
| 6,206,355 | B1 | * | 3/2001 | Lichtenberg ........... B25B 5/003 |
| | | | | 269/156 |
| 8,051,515 | B1 | | 11/2011 | Kring |
| 9,022,334 | B1 | | 5/2015 | DeMayo |
| D759,474 | S | * | 6/2016 | Pittman ......................... D8/395 |
| 2011/0266425 | A1 | * | 11/2011 | Kallabis ............... G01C 15/006 |
| | | | | 250/239 |
| 2013/0019883 | A1 | * | 1/2013 | Worm ................ A61G 13/101 |
| | | | | 128/882 |

OTHER PUBLICATIONS

Chinese Office Action and Chinese Search Report dated Nov. 29, 2019 during the prosecution of corresponding Chinese Patent Application No. 201580073118.X, 21 pages.

* cited by examiner

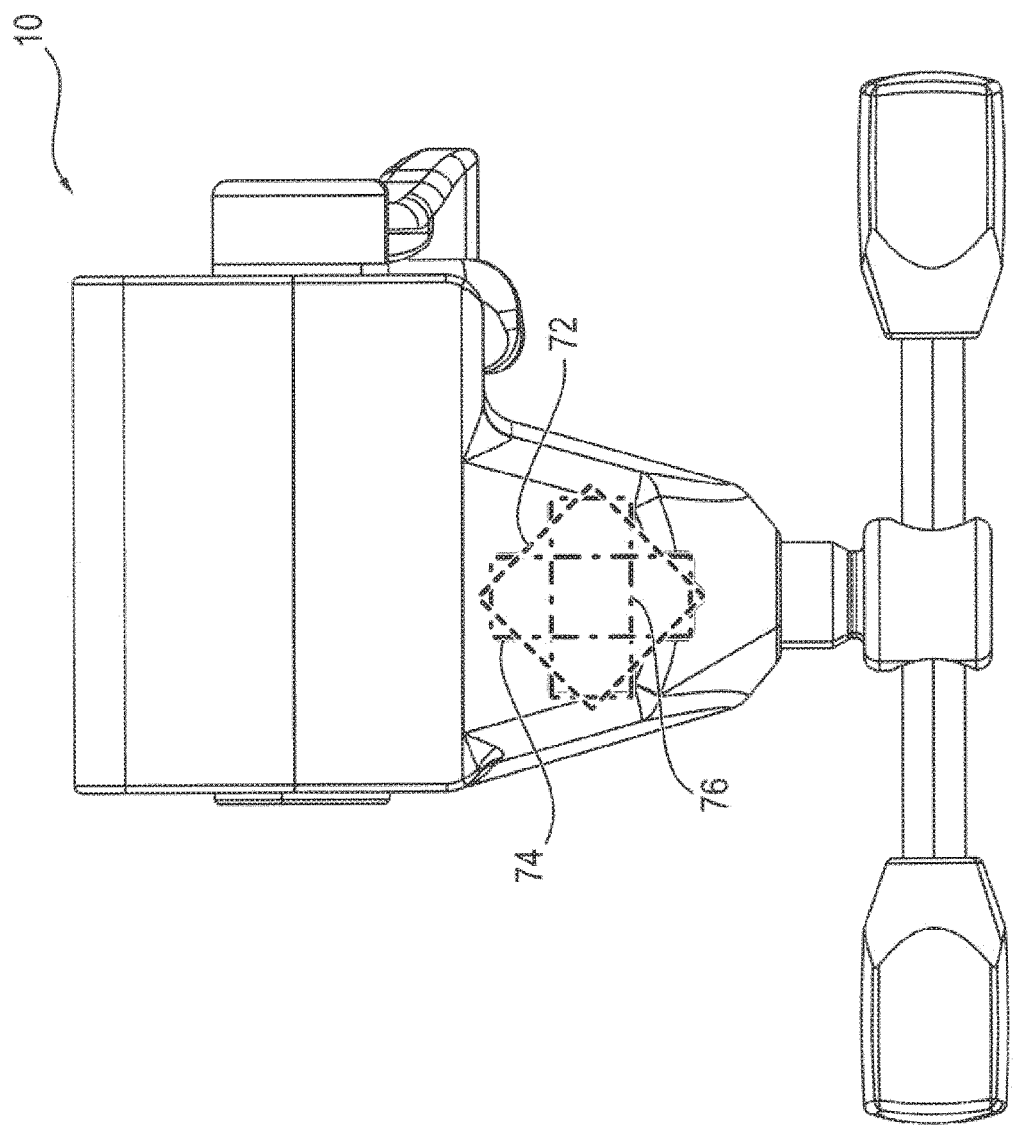

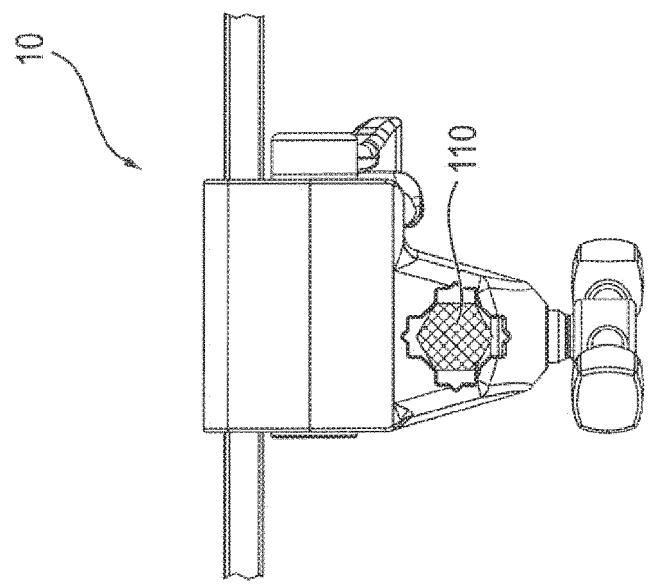
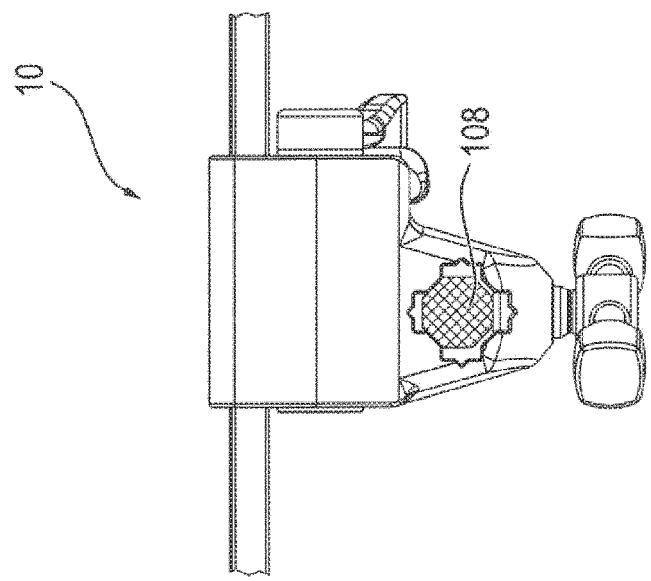

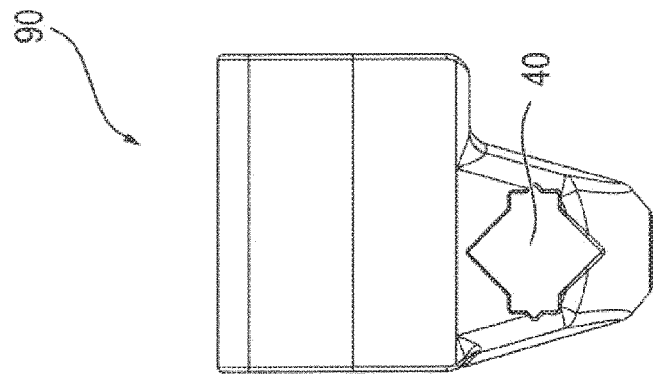
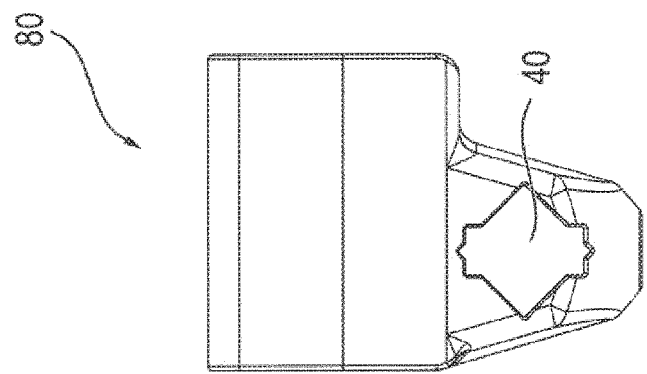

DEVICE FOR SECURING AN ACCESSORY TO AN OPERATING TABLE

CROSS REFERENCE TO RELATED APPLICATIONS

The present application is a continuation-in-part filed under 35 U.S.C. § 111(a), and claims the benefit under 35 U.S.C. §§ 365(c) and 371 of PCT International Application No. PCT/EP2015/078789, filed Dec. 7, 2015, and which designates the United States of America, and German Patent Application No. 10 2015 114 402.6, filed Aug. 28, 2015. The disclosures of these applications are herein incorporated by reference in their entirety.

TECHNICAL FIELD

The disclosure relates to a device for securing an accessory to an operating table, which may comprise a base body, a first securing unit for securing the device to the operating table, for example on a rail of the operating table, and a second securing unit for securing a rod of the accessory to the device.

BACKGROUND

Patients are typically arranged in different positions depending on the type of intervention during surgeries. For example, this can be a side position in the case of kidney surgery. Since the patient does not lie stably in such positions, a device for supporting or stabilizing the patient in a position is provided.

For this purpose, so-called body supports are used, in order to stabilize a patient in a predetermined position on the operating table. The body supports are typically secured to rails located on the sides of the operating table. In order to support the patients of different body type, the height of the body supports is typically adjustable and it is typically possible to fix the body supports at a set height. Thus, forces that are introduced via the securing devices into the operating table typically act on these body supports from outside. Such devices for fastening accessories are commonly also referred to as brackets.

The forces to be introduced are torques that are introduced around an axis parallel to the operating table. Because the rails are not formed along the complete resting surface, supports may also be used, which can support the patient at the sites where no rail is arranged immediately beneath. In these cases, torques are also introduced via the brackets into the rails around an axis that is perpendicular to the surface of the operating table.

The forces to be introduced are forces that support the patient in such a manner that, in the case of a setting of the support surface at an inclination with respect to the horizontal plane, for example, in the case of a Trendelenburg position, he/she does not slide off the resting surface. For this purpose, so-called shoulder supports or foot supports are usually used, which are also typically connected via a bracket to the slide rail of the operating table, which is attached on the side. Here the torques that are supported are thus torques around an axis that is arranged parallel to the surface of the resting surface and at a right angle to the longitudinal direction thereof.

Because, on the one hand, the resting surface can also be oriented in space by the simultaneous inclination in longitudinal direction and around an axis arranged parallel to the longitudinal axis of the resting surface, and, since, on the other hand, accessories are attached via the brackets, such as instrument racks, infusion stands and narcotic bows (that is to say accessories that do not support the patient but that are needed for general work or for securing covering material, tubes, lines or apparatuses for intra-operative drug administration), any combinations of torques and forces onto the brackets which have to be held securely are possible.

One possibility of ensuring the safest possible introduction of the forces and torques via the brackets is to connect the body supports by firm bonding to the brackets. This has the disadvantage that the bracket is firmly connected to the accessory, resulting in a large total weight of the accessory. Furthermore, it is disadvantageous that for each accessory, a bracket also needs to be secured to said accessory, which increases the costs and the storage space needed.

Furthermore, systems are known in which the body supports are connected by positive locking connection via special brackets. In the known systems, there typically one bracket that is suitable for a certain body support or a body support series. The rods of the body supports commonly have rectangular, square or round profiles. Hexagonal or octagonal profiles are also known. In the known brackets, for each profile type, a special bracket is typically used, which has the disadvantage that a plurality of different brackets are kept in storage, and it can easily happen that at first an attempt is made to use an unsuitable bracket.

Furthermore, using such brackets, for example, narcotic bows are also secured to the rails of the operating table. A narcotic bow is a rod assembly that is attached on the side to the slide rails of a resting surface in the area between a patient's neck and a patient's chest. To these rod assemblies, on the one hand, the sterile sheets covering the patients are attached, in order to give the anesthesiologist the best possible access to the head of the patient. On the other hand, the arms of the patient can be fixed to the rod assembly, in order to simplify the access to the operating field for the surgical team. In the case of narcotic bows as well, many different profiles are known, wherein, here too, special brackets for each profile type are used.

In addition, arm rests for the interoperative bearing of the patient's arm are attached to the rails via brackets.

In addition, so-called radial setting clamps for connecting accessory rods to operating tables are known. These are characterized in that the accessory rods can additionally be rotated about an axis which is oriented, on the one hand, in a plane parallel to the surface of an operating table and, on the other hand, at a right angle with respect to the longitudinal orientation of the operating table, and fixed at an angle relative to the surface of the operating table. The fixation and the angular setting of the rods occurs via a manually operated actuation element, wherein, for this purpose, a tommy screw is commonly used as securing element to be actuated manually. However, such radial setting clamps are designed exclusively for receiving rods having round profiles. Accessories with rods of rectangular profile are not secured via these radial setting clamps to the rails. Moreover, the disadvantage here is that, with the loosening of the tensioning by the tommy screw, substantially all degrees of freedom are released simultaneously, so that a fine setting of the position of the accessories secured via the radial setting clamp is not possible.

SUMMARY OF THE DISCLOSURE

It is the aim of the present disclosure to indicate a device for securing accessories to an operating table, by which a large number of different accessories can be secured simply and reliably independently of the profile thereof to the operating table.

In at least some exemplary embodiments, the second fastening unit may have a hole for receiving a rod of the accessory as well as a clamping unit for clamping a rod received in the hole. The cross section of the hole may be designed here in such a manner that, in the hole, both rods having a first profile type and rods having at least one second profile type can be secured by the clamping unit.

In at least some exemplary embodiments, both rods of the first profile type and rods of the second profile type can be accommodated with positive locking connection in the hole.

In at least some exemplary embodiments, rods having the first and the second profile can be secured to an operating table by substantially the same device. For example, a special device may not be used in the process for each profile shape, the accommodation area of which may be adapted to the corresponding profile shape. Thus, mix-ups may be substantially prevented, and the handling may be simplified. Furthermore, the number of parts that may be stored may be smaller, which may reduce the costs and the storage space needed.

In at least some exemplary embodiments, the profile may be the outer shape of the cross section of the respective rod. The rods can thus have, for example, a rectangular, a round or a square profile, wherein, in the context of this application, a rectangular profile may be a profile that is not square.

In at least some exemplary embodiments, the hole may be designed here in such a manner that the shaping of the wall thereof is adjusted both to the first profile type and also to the second profile type.

Profile type may denote the respective type of the cross section, that is, for example, round rods or rectangular rods. Different profile types may be rods not of identical shape but rather rods of different dimensions, for example, two round profiles with different diameters.

In at least some exemplary embodiments, the hole may be shaped in such a manner that it is designed to be complementary in one subsection to the first profile type and complementary to the second profile type in a second subsection. As a result, both rods of the first profile type and also rods of the second profile type can be clamped in securely, since they are in contact with the wall of the hole over a largest possible area.

In at least some exemplary embodiments, the cross section of the hole is designed in such a manner that, in the hole, rods with at least a third profile type can be secured. Thereby, an even larger number of different profiles can be accommodated, so that, using one (e.g., a single) device, it is possible to secure all common profile types to the operating table.

In at least some exemplary embodiments, the hole may be designed in such a manner that rods with a circular profile, rods with a circular profile with flat surfaces, rods with a rectangular profile and/or rods with n-gonal axis-symmetric profile can be accommodated respectively within a predetermined dimension range. Thereby, substantially all common profiles within the common dimension ranges can be secured via the device to the operating table. An n-gonal axis-symmetric profile denotes, for example, a symmetric hexagonal or symmetric octagonal profile.

In at least some exemplary embodiments, the cross section of the hole may be designed in such a manner that rods of the first profile type and also rods of the second profile type can come in contact with the hole on the side facing the clamping unit, along at least three point contacts or two lines. For example, these two lines may not lie on a common axis but instead may be arranged parallel to one another. Via the contact along two lines or three point contacts, a reliable securing both of rods of the first profile type and also of rods of the second profile type in the hole may be provided. In particular, via the contact (e.g., the contact at more than one line), a twisting or tilting of the respective rod may be substantially prevented.

In at least some exemplary embodiments, the cross section of the hole may be designed in such a manner that at least rods of the first profile type come in flat contact with the hole on the side facing the clamping unit. Via the flat contact, a suitable hold may be provided. For example, relatively larger forces may not negatively affect the device and/or the rods, for example in the case of hollow profiles. For example, rods of the second profile type, when they are accommodated in the hole, may be in flat contact with the wall facing the clamping unit.

In at least some exemplary embodiments, the cross section of the hole may be designed in such a manner that rods of the second profile type may be clamped in the hole in such a manner that a lateral slipping of the accommodated rods is substantially prevented via the contact with the wall of the hole. The hole may be shaped, for example, in such a manner that the rods may be contacted independently of the profile type thereof on at least two sides, so that slipping and twisting may be substantially prevented.

In at least some exemplary embodiments, the cross section of the hole may result from the superposition of a square and a rectangle, wherein the square may be rotated, for example, by 45° relative to the rectangle. For example, the centers may coincide and that the diagonals may be rotated with respect to one another by 45°.

As a result of this shaping, rectangular, square, round and also n-gonal axis-symmetric profiles can be suitably clamped in, because, in a side facing the clamping unit, they may be in each case in contact at several sites or in flat contact with a wall of the hole, in such a manner that slipping, twisting and/or tilting of the rods is substantially prevented.

In at least some exemplary embodiments, the cross section of the hole may be formed partially by the square and partially by the rectangle. For example, the diagonal of the square may be longer than the longest side of the rectangle, so that, on the short sides of the rectangle as well, a V-shaped notch may be formed by the protruding corners of the square. By this notch, square profiles can be clamped in a twist-proof and tilt-proof manner, in that an edge of the square profile may be arranged in the corresponding facing V-shaped notch.

In at least some exemplary embodiments, the cross section of the hole can also result from the superposition of a square and two rectangles, wherein the rectangles are arranged rotated for example with respect to one another by 90° and the square is arranged rotated relative to the respective rectangles by 45° The rectangles may be arranged, for example, in such a manner that the centers coincide and the longer sides of the two rectangles are arranged orthogonally with respect to one another.

Due to this shaping of the cross section, the number of possible profiles that can be secured reliably via the device to the operating table can be increased even more. For example, rectangular profiles can thus be accommodated in two different orientations rotated by 90°.

The square and the rectangles are arranged, for example, in such a manner that they project beyond one another in each case, so that the cross section of the hole may be formed (e.g., delimited) partially by the square, partially by one rectangle and partially by the other rectangle.

The rectangles may for example be shaped substantially identically, wherein the diagonal of the square may be longer than the longer sides of the rectangles. As a result, in the short sides of the rectangles, V-shaped notches for accommodating the edges of square profiles may be provided.

Furthermore, the clamping unit may be designed as a tensioning screw, for example a tommy screw. Thus, in a relatively simple manner, a clamping and also again a loosening of the securing of the rod can be achieved. The tensioning screw may comprise, for example, a flat contact surface for coming in contact with the rods to be clamped in. Thereby, round, rectangular and/or square rods can be clamped in suitably (e.g., clamped in so that a contact is provided along a line and/or even along a plane).

In at least some exemplary embodiments, the first fastening unit of the device may be designed to be a clamping unit for clamping (e.g., firmly clamping) the device on the rail of an operating table. In particular, the clamping unit may have a first hook, by which the device can be mounted on the upper edge of the rail. Furthermore, a second hook may be provided, which can be moved by a manually actuated lever and which can enclose the rail from below. Thus, a suitable (e.g., firm clamping) clamping in a desired position is made possible. Thereby, the device may be substantially prevented from falling off the rail and/or an unsuitable lateral sliding may be substantially prevented.

BRIEF DESCRIPTION OF THE DRAWINGS

Additional features and advantages of the disclosure will be apparent from the following description, which explains the disclosure in the context of exemplary embodiments, with reference to the accompanying figures.

FIG. 4 illustrates another diagrammatic perspective representation of the device according to FIG. 1.

FIG. 9 illustrates a top view of the exemplary device according to FIGS. 1 to 4 in the case of accommodation of a rod with an octagonal profile.

FIG. 10 illustrates a top view of the exemplary device according to FIGS. 1 to 4 in the case of a rod with a hexagonal profile.

FIG. 11 illustrates a diagrammatic representation of an exemplary device for securing an accessory to an operating table according to an additional embodiment.

FIG. 12 illustrates a diagrammatic representation of a device for securing an accessory to an operating table according to an additional embodiment.

DETAILED DESCRIPTION AND INDUSTRIAL APPLICABILITY

Figure 1:
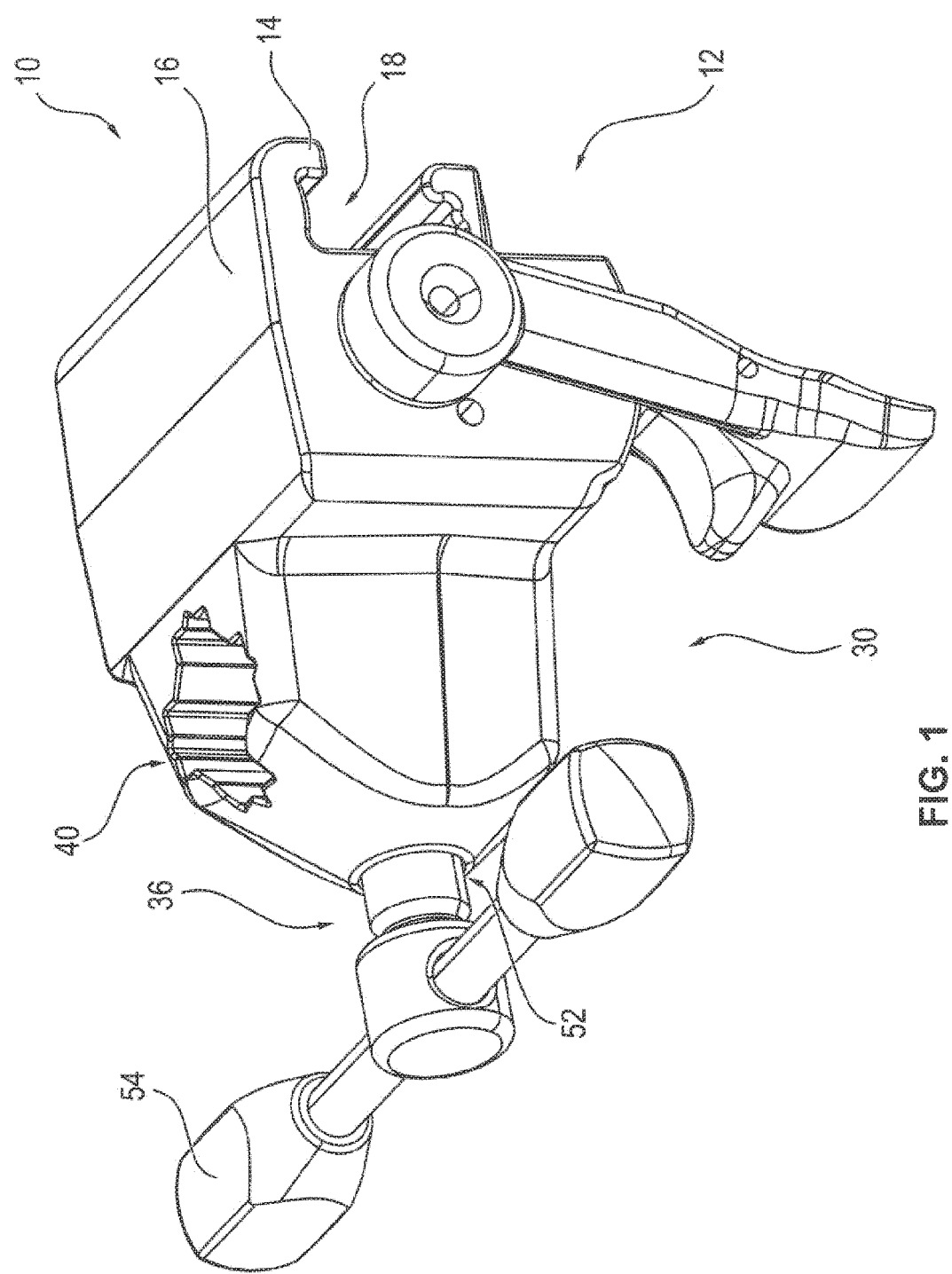
FIG. 1 illustrates a diagrammatic perspective representation of an exemplary device for securing an accessory to an operating table.
Figure 2:
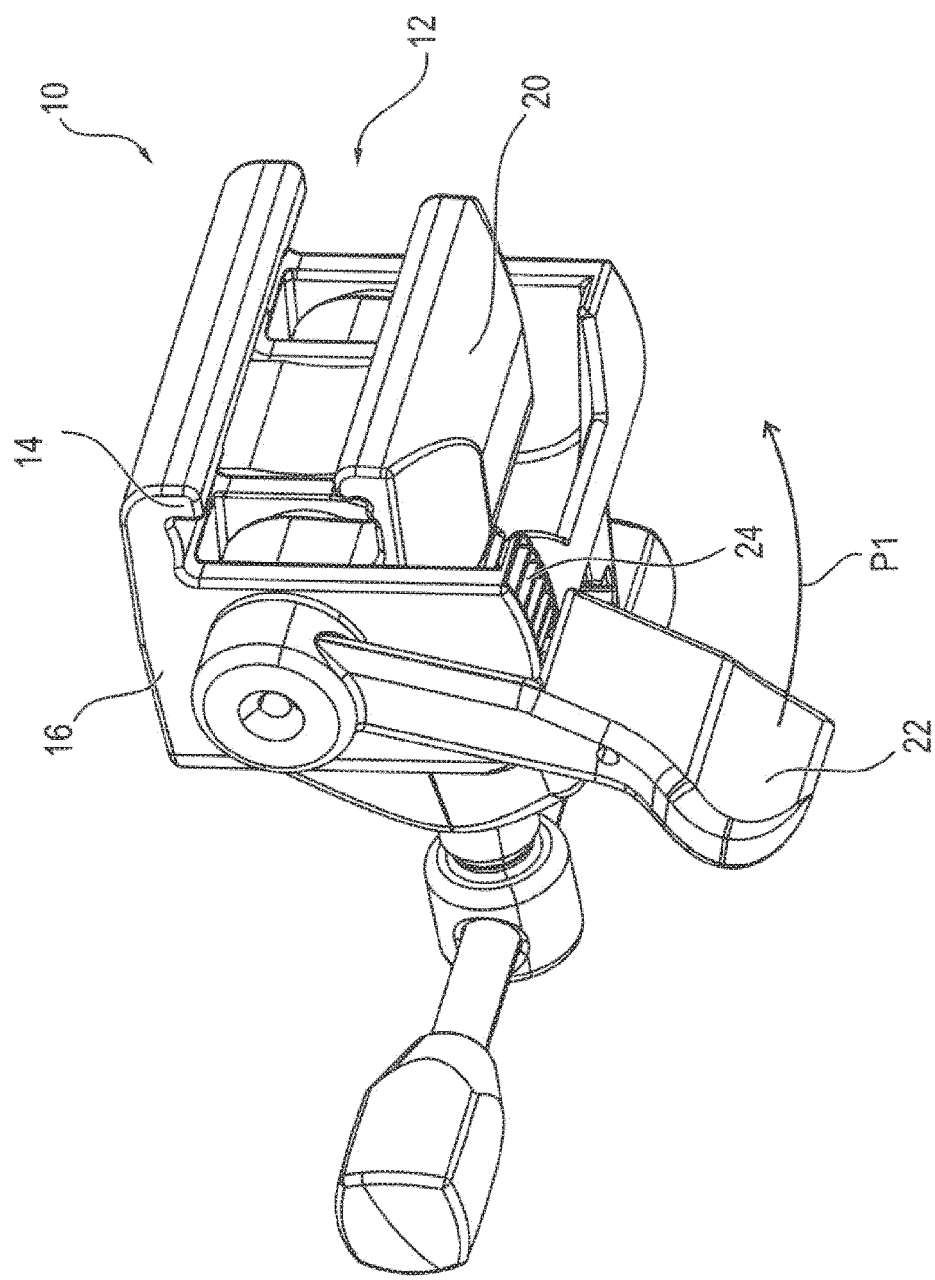
FIG. 2 illustrates another diagrammatic perspective representation of the exemplary device according to FIG. 1.

In FIGS. 1 and 2, in each case, a diagrammatic perspective representation of a first embodiment of an operating table device 10 for securing accessories to rails of an operating table is shown. The device 10 may be, for example, a bracket.

The device 10 may comprise a first securing assembly (e.g., first securing unit 12) for securing the device 10 to the rails of the operating table. This first securing unit 12 may comprise a first hook 14, which may be designed to be part of a base body 16 of the device 10. This hook 14 can be hung over the upper side of the rail of the operating table, so that the rail is accommodated in the recess 18.

Furthermore, the first fastening unit 12 may comprise an additional hook 20, which can be adjusted manually via a lever 22. As soon as the device 10 has been put from above onto the rail, the lever 22 may be moved out of the position shown in FIG. 2 in the direction of the arrow P1, as a result of which the second hook 20 may be moved in the direction of the arrow P1, so that it encloses the rail of the operating table from below and thus may establish a clamping connection. As a result, a reliable securing on an operating table rail may be achieved. For example, an axial sliding on the rail may also be substantially prevented. The lever 22 may comprise a snap-in element, and which can engage in a complementary detent 24 in such a manner that the lever 22 and thus the second hook 20 may remain in the desired position.

On the side of the base body 16 facing away from the first securing unit 12, a second securing assembly (e.g., second securing unit 30) for securing an elongated member of an accessory (e.g., a rod of an accessory) to the device 10 and thus to the operating table may be provided. This accessory can be, for example, a body support, an arm support and/or an anesthesia bow. These accessories have in common that they may comprise a rod which is to be secured extending vertically to the operating table in a height adjustable manner via the device 10. As described for example below, this may be made possible for a relatively large number of different predetermined profiles of the rod.

The second securing unit 30 may have an aperture (e.g., a hole, through-hole, or passage hole 40), through which the rods of the accessories to be attached (e.g., secured) to the device 10 may be led. The hole 40 may be designed for example in such a manner that rods with a square profile, rods with a rectangular (non-square) profile, and also rods with a round profile with or without planar surface, rods with a hexagonal profile and also rods with an octagonal profile, for example in each case between a minimum and a maximum size, can be led.

In this regard, the hole 40 may have, for example, on the side facing the clamping assembly (e.g., tommy screw 36), a flat surface 42 as side wall, and a V-shaped notch 44 may be provided in the middle.

The second securing unit 30 may comprise a hole 52 which may extend up to and into the hole 40. In the hole 52, a threading may be provided, in which the tensioning screw 36 engages. The tensioning screw 36 may comprise, for example, a flat contact surface 56 for coming in contact with the rods to be clamped in (See FIG. 3). By turning the lever 54 of the tensioning screw 36, the latter can be moved in axial direction of the hole 52 into the hole 40 and out of the latter, as a result of which the accommodated rods, as will be described below, may be clamped in.

The hole 40 may be designed in such a manner that the longitudinal axis thereof, in the case of installation of the device 10 according to plan, may be vertically oriented on a horizontally extending rail of the operating table.

Figure 3:
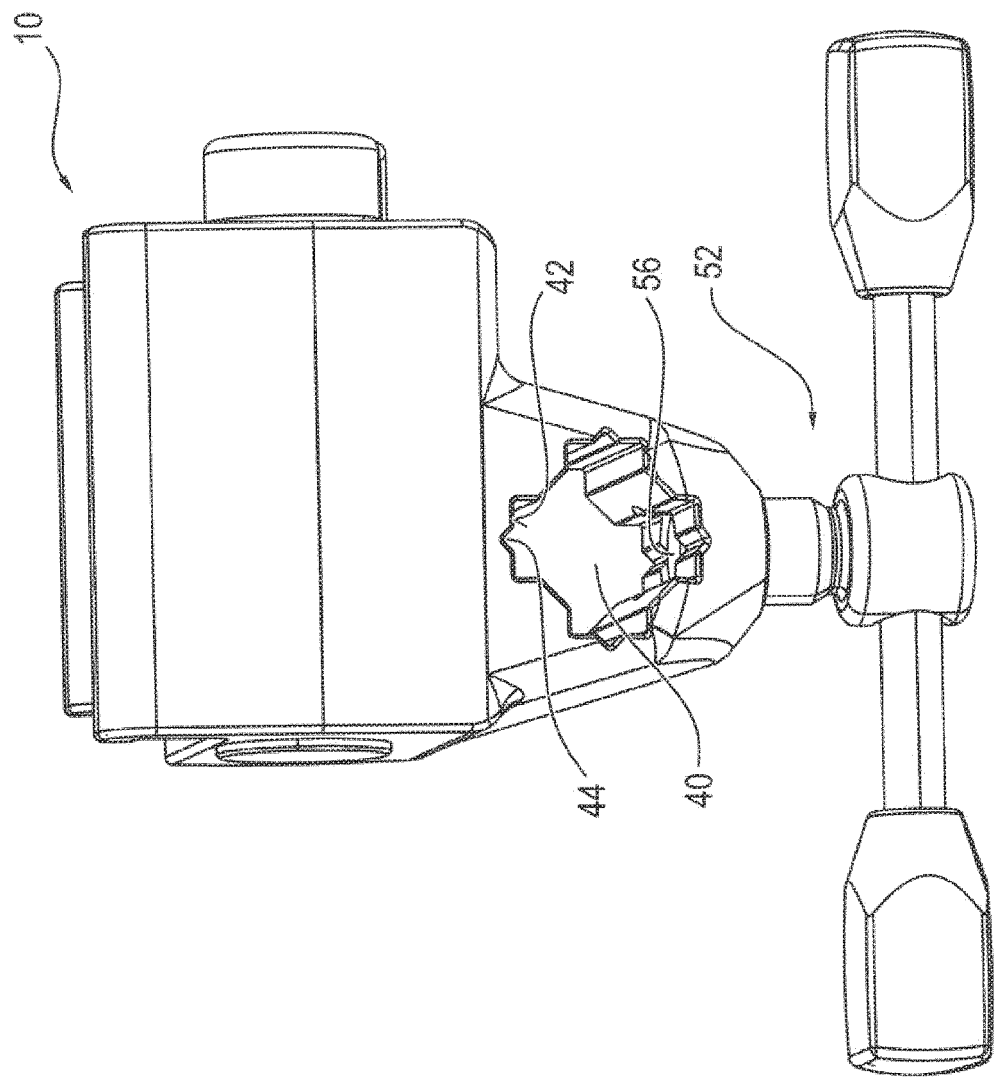
FIG. 3 illustrates another diagrammatic perspective representation of the exemplary device according to FIG. 1.

In FIG. 3, an additional diagrammatic perspective representation of the device 10 is shown, wherein, here, the view is directed into the hole 40. The hole 40 may be shaped in such a manner that rods with a round profile, rods with a rectangular, non-square profile, rods with a square profile, rods with a hexagonal profile and also rods with an octagonal profile can be clamped suitable (for example, reliably) within the hole. The aperture (e.g., hole 40) may have a cross section having a polygonal shape, the polygonal shape being formed from at least two superimposed shapes, each of the at least two superimposed shapes having straight sides (for example, as shown in FIGS. 3-12). For example, the cross section of the hole 40 can be selected in such a manner that some or all the above-mentioned profile types may abut, on the facing side of the hole 40, against the wall of the hole either with flat contact or at least along two contact lines, so that both slipping and also twisting may be substantially prevented. The corresponding contacting can be seen for example in FIGS. 5 to 10 for the different profile types mentioned above. It is also contemplated that the cross section of the aperture (e.g., hole 40) may have one or more sides that are not straight (e.g., curved or elliptical).

In FIG. 4, an additional diagrammatic perspective representation of the device 10 according to FIGS. 1 to 3 is shown, wherein, for explaining the shaping of the hole 40, exemplary geometric shapes in the hole 40 are indicated by dotted lines or broken-dotted lines.

The cross section of the hole 40 may result from the superposition of a square 72 as well as two rectangles 74, 76. The rectangles may be shaped substantially identically and may be arranged rotated with respect to one another by 90° (e.g., by about 90°). The square 72 may be arranged rotated by 45° (e.g., by about 45°) relative to the two rectangles, wherein the center of the square 72 and the centers of the rectangles 74, 76 may coincide at a point. The diagonal lengths (e.g., the straight distance length from one corner of the square to the opposite corner of the square) of the square 72 may be longer than the long sides of the rectangles 74, 76, as a result of which the square may project on the short sides of the rectangle beyond said rectangles, so that they result in V-shaped notches in the contour of the hole 40. For example, viewed overall, the contour of the hole 40 may be formed on some parts by the square 72, on some parts by the rectangle 74, and on some parts by the rectangle 76.

As explained below in connection with FIGS. 5 to 10, via this shaping (e.g., exemplary special shaping) of the hole 40, some or all the common profile types can be suitably clamped via the device 10 and thus attached (e.g., secured) to the operating table.

Figure 5:
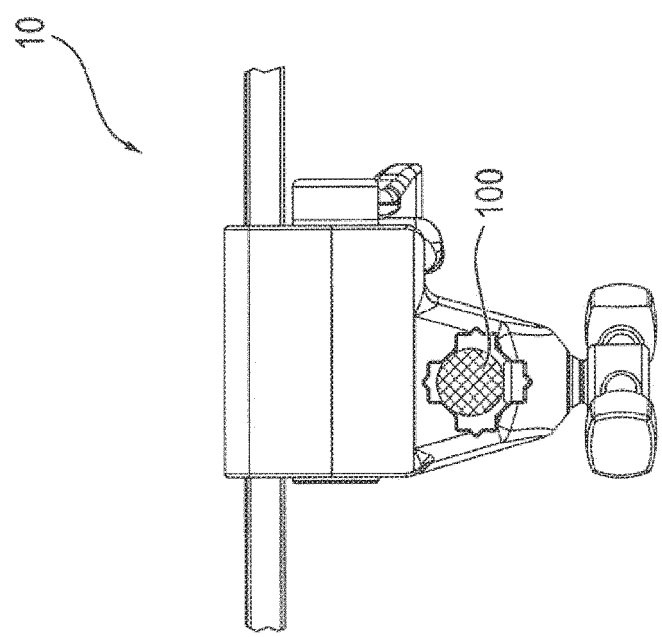
FIG. 5 illustrates a top view of the exemplary device according to FIGS. 1 to 4 in the case of accommodation of a rod with a round profile.

In FIG. 5, the accommodation of elongated member 100 (e.g., a rod) with a round profile is shown. This rod may abut against the wall of the hole 40 on the side facing the tensioning screw 36 via two contact lines and may thus be reliably fixed.

Figure 6:
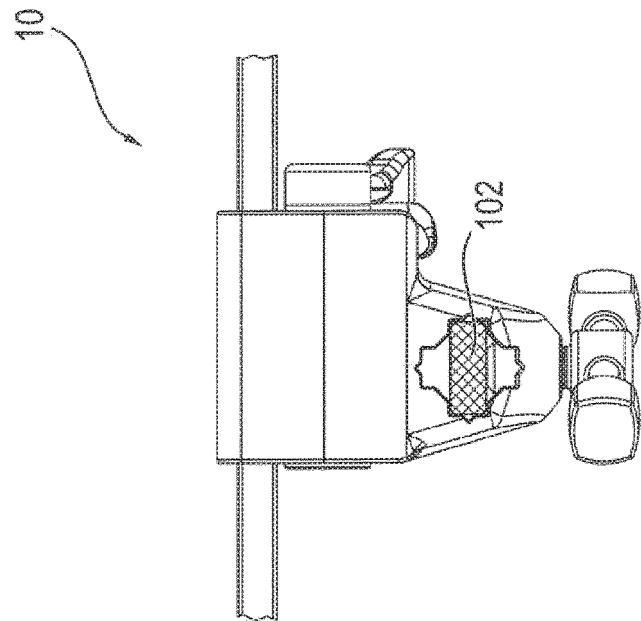
FIG. 6 illustrates a top view of the exemplary device according to FIGS. 1 to 4 in the case of accommodation of a rod with a rectangular profile.

FIG. 6 shows a top view onto the device 10 according to FIGS. 1 to 4, wherein a rod 102 with a rectangular profile may be clamped in. The rod 102 may lie flat against the subsection of the periphery of the hole 40 which may be formed by the rectangle 76, so that the rod 102 can also be suitably fixed (e.g., reliably fixed).

Figure 7:
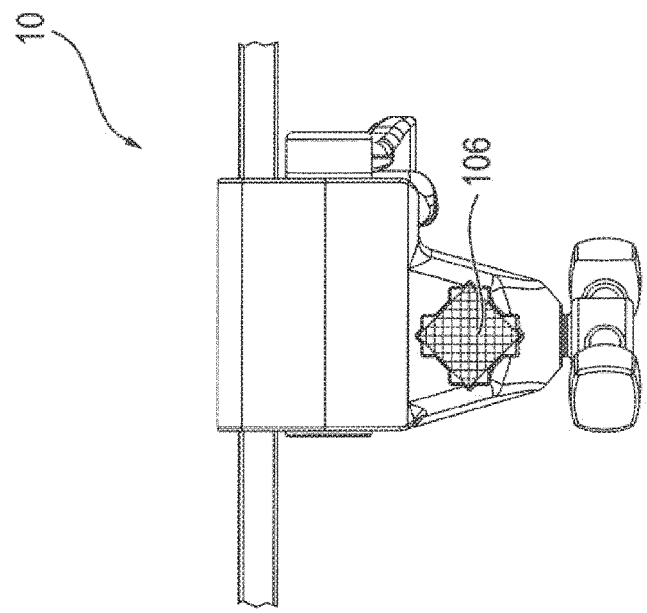
FIG. 7 illustrates a top view of the exemplary device according to FIGS. 1 to 4 in the case of accommodation of an additional rectangular rod.

FIG. 7 shows a top view onto the device 10 according to FIGS. 1 to 4, wherein a rod 104 with a rectangular profile may be accommodated. However, in comparison to the exemplary rod 102 in FIG. 6, this rod 104 may be arranged rotated by 90°. This rod may be pressed via the tensioning screw 36 against the surfaces formed by the rectangle 74, so that the rod 104 can also be clamped in a slide-proof and twist-proof manner.

Figure 8:
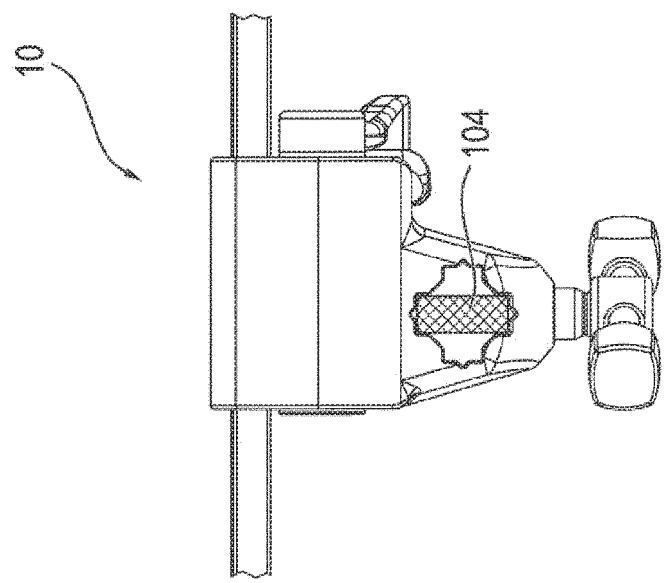
FIG. 8 illustrates a top view of the exemplary device according to FIGS. 1 to 4 in the case of accommodation of a rod with a square profile.

In FIG. 8, a top view onto the device 10 is shown, wherein a rod 106 with a square profile may be accommodated in the hole 40. Here, the edges of the square profile may be accommodated in the V-shaped notches formed by the square 72, so that a suitable hold (e.g., reliable hold) may be provided.

In FIG. 9, an additional top view onto the device 10 is shown, wherein a rod 108 with an octagonal profile may be accommodated.

FIG. 10 shows a top view onto the device 10 according to FIGS. 1 to 4, wherein a rod 110 with a hexagonal profile 104 may be accommodated in the hole and suitably clamped in (e.g., clamped in reliably).

In FIG. 11, a diagrammatic representation of a device 80 for securing an accessory to an operating table according to a second embodiment is shown. In this second embodiment, the hole 40 may be shaped differently, for example including the superposition of the square 72 and the rectangle 74.

In this shaping as well, as before, a relatively large number of different profile types, but for example not as many profile types as in the first embodiment, can be accommodated. For example, no rectangular profiles that are arranged in accordance with the rod 102 in FIG. 6 can be accommodated.

In FIG. 12, a top view onto a device 90 for securing an accessory to an operating table according to a third embodiment is shown. In this third embodiment, the hole 40 may be shaped in such a manner that the cross section thereof may result from the superposition of the square 72 and the rectangle 76. In at least some exemplary embodiments, substantially no rods that are arranged for example in accordance with the rod 104 according to FIG. 7 can be accommodated.

Overall, via the above-described device 10, rods 100 to 108 with many different predetermined profiles can be secured via the device 10 to the operating table. Furthermore, unsuitable rods may be substantially prevented from being introduced in the respective set operating state, which may provide suitable securing (e.g., reliable securing).

Thus, the user may use for example a single device 10 which is used for a relatively large number of accessories. In addition, the device 10 may not be secured permanently via a bonding connection to the respective accessories.

In at least some exemplary embodiments, the device 10 can remain on the operating table when the patient is transferred to a different bed, because the device 10 may not project beyond the operating table and thus may not impede the transfer.

In addition, via the device 10, the handling may be overall simplified, because all the accessories can be fixed by substantially the same handholds and are not adjusted by the user in each case depending on individual securing devices. In addition, unlike in the case of radial setting clamps, a tilting away of the device 10, when the securing is released, may be substantially prevented.

Furthermore, the square profiles may be clamped on the edges, whereby, unlike in the case of flat clamping, a deformation may be substantially avoided in the case of hollow profiles.

It will be apparent to those skilled in the art that various modifications and variations can be made to the disclosed method and apparatus. Other embodiments will be apparent to those skilled in the art from consideration of the specification and practice of the disclosed method and apparatus. It is intended that the specification and the disclosed examples be considered as exemplary only, with a true scope being indicated by the following claims.

What is claimed is:

1. An operating table device for securing an accessory to an operating table, comprising:
   a first securing assembly configured to attach the operating table device to the operating table; and
   a second securing assembly configured to attach an elongated member of the accessory to the operating table device;
   wherein the second securing assembly includes an aperture configured to receive the elongated member of the accessory;
   wherein the second securing assembly includes a clamping assembly configured to clamp the elongated member of the accessory in the aperture;
   wherein a cross section of the aperture has a polygonal shape, the polygonal shape being formed from at least three superimposed shapes-including a square, a first rectangle, and a second rectangle; and
   wherein the square, the first rectangle, and the second rectangle project out beyond one another, so that a perimeter of the aperture is formed partially by edges of the square, partially by edges of the first rectangle, and partially by edges of the second rectangle.

2. The operating table device of claim 1:
   wherein the aperture has the shape of an X, the X having four ends, with V-shaped notches extending out from a plurality of the four ends of the X.

3. The operating table device of claim 1, wherein the square is rotated by 45° relative to at least one of the first rectangle and the second rectangle.

4. The operating table device of claim 1:
   wherein the perimeter of the aperture is formed by edges having a plurality of different lengths.

5. The operating table device of claim 1, wherein a diagonal of the square is longer than a longer side of the first rectangle.

6. The operating table device of claim 1:
   wherein the perimeter of the aperture includes both inward points and outward points with respect to an inside of the aperture.

7. The operating table device of claim 1, wherein the first rectangle is rotated by 90° with respect to the second rectangle, and the square is rotated by 45° in each case relative to the first and second rectangles.

8. The operating table device of claim 1, wherein the first rectangle and the second rectangle are shaped identically, and a diagonal of the square is longer than a longer side of the first and second rectangles.

9. An operating table device for securing an accessory to an operating table, comprising:
   a first securing assembly configured to attach the operating table device to the operating table; and
   a second securing assembly configured to attach an elongated member of the accessory to the operating table device;
   wherein the second securing assembly includes an aperture configured to receive the elongated member of the accessory;
   wherein the second securing assembly includes a clamping assembly configured to clamp the elongated member of the accessory in the aperture;
   wherein a cross section of the aperture has a perimeter and is formed from at least two superimposed shapes, each of the at least two superimposed shapes having at least four straight sides; and
   wherein the perimeter of the aperture includes both a plurality of inward-facing points and a plurality of outward-facing points with respect to an inside of the aperture.

10. The operating table device of claim 9, wherein the at least two superimposed shapes include a square and a rectangle.

11. The operating table device of claim 9, wherein the first securing assembly is configured to attach the operating table device to a rail of the operating table.

12. The operating table device of claim 9, wherein the clamping assembly includes a screw.

13. The operating table device of claim 9:
   wherein the aperture has the shape of an X, the X having four ends, with a pointed projection extending out from each of a plurality of the four ends of the X.

14. The operating table device of claim 12, wherein:
   the screw is a tensioning screw which includes a planar contact surface configured to contact the elongated member; and
   the elongated member is a rod.

15. An operating table device for securing an accessory to an operating table, comprising:
   a first securing assembly configured to attach the operating table device to a rail of the operating table; and
   a second securing assembly configured to attach a rod of the accessory to the operating table device;
   wherein the second securing assembly includes an aperture configured to receive the rod of the accessory;
   wherein a cross section of the aperture has a polygonal shape, the polygonal shape being formed from at least two superimposed shapes;
   wherein the aperture has the shape of an X, the X having four ends, with a notch extending out from each of a plurality of the four ends of the X.

16. The operating table device of claim 15, wherein the cross section is configured to receive rods having a circular profile, having a rectangular profile, having a square profile, or having an n-gonal, axis-symmetric profile, when a rod is present.

17. The operating table device of claim 15, wherein:
   the at least two superimposed shapes include a square, a first rectangle, and a second rectangle;
   the square is rotated by 45° relative to at least one of the first rectangle and the second rectangle; and
   wherein corners of the square provide four V-shaped notches extending out from the four ends of the X.

18. The operating table device of claim 9:
   wherein the shape of the aperture consists of a rectangle superimposed on a square, the rectangle having two long sides and two sort sides;
   wherein a diagonal dimension of the square is longer than the long sides of the rectangle; and
   wherein the square is superimposed on the rectangle such that two opposite corners of the square extend out from and beyond respective short sides of the rectangle forming notches.

19. The operating table device of claim 15,
wherein the at least two superimposed shapes comprise two identically shaped, overlapping rectangles, with the rectangles together creating said X shape; and
wherein the X shape includes four legs, with each leg having substantially the same length.

20. The operating table device of claim 15, wherein the second securing assembly includes a clamping assembly configured to clamp the rod of the accessory in the aperture, the clamping assembly comprising a screw.

* * * * *